United States Patent
Dunlap et al.

(10) Patent No.: US 8,802,966 B2
(45) Date of Patent: Aug. 12, 2014

(54) METHODS AND SYSTEMS FOR LIGHT ENERGY AUGMENTED POWER

(75) Inventors: Philip S. Dunlap, Rancho Palos Verdes, CA (US); Robert J. Budica, Laguna Hills, CA (US)

(73) Assignee: The Boeing Company, Chicago, IL (US)

( * ) Notice: Subject to any disclaimer, the term of this patent is extended or adjusted under 35 U.S.C. 154(b) by 308 days.

(21) Appl. No.: 13/311,609

(22) Filed: Dec. 6, 2011

(65) Prior Publication Data

US 2013/0140916 A1    Jun. 6, 2013

(51) Int. Cl.
*H02J 17/00*    (2006.01)

(52) U.S. Cl.
USPC .......................................... 136/246; 136/259

(58) Field of Classification Search
USPC .................................. 136/246, 259
See application file for complete search history.

(56) References Cited

U.S. PATENT DOCUMENTS

| | | |
|---|---|---|
| 5,019,768 A | 5/1991 | Criswell et al. |
| 5,198,607 A | 3/1993 | Livingston et al. |
| 5,223,781 A | 6/1993 | Criswell et al. |
| 8,188,366 B2 * | 5/2012 | Hecht ............. 136/259 |

OTHER PUBLICATIONS

URSI Inter-commission Working Group on SPS; Supporting Document for the URSI White paper on Solar Power Satellite Systems; Nov. 2005; pp. 1-D-4 (part 1 of 2).
URSI Inter-commission Working Group on SPS; Supporting Document for the URSI White paper on Solar Power Satellite Systems; Nov. 2005; pp. D-5-E-22 (part 2 of 2).

* cited by examiner

*Primary Examiner* — Tony Ko
(74) *Attorney, Agent, or Firm* — Armstrong Teasdale LLP

(57) ABSTRACT

A method for transmitting power over long distances to a remote device is described. The method includes positioning a lens between a photon source and a photon receiver, the lens, photon source and photon receiver being physically separate systems, focusing a plurality of photons originating from the photon source using the lens, collecting the photons at a receiver, and utilizing the collected photons to generate electrical power.

14 Claims, 10 Drawing Sheets

US 8,802,966 B2

METHODS AND SYSTEMS FOR LIGHT ENERGY AUGMENTED POWER

BACKGROUND

The field of the disclosure relates generally to providing of energy to remote and inaccessible systems, and more specifically, to methods and systems for light energy augmented power distribution.

In remote and inaccessible systems, such as satellites and spacecraft, energy for propulsion and for powering internal systems is needed. This need for energy drives weight and volume requirements for both hardware/software systems and consumed-logistics. These requirements include fuel and chemicals, storage systems, as well as, processing and/or transference to a useful energy form. Seemingly, many systems are designed to carry energy for an entire mission, rather than the receiving of energy in-transit and at remote distances.

Space exploration is limited by power, which is further complicated by the above mentioned logistics. Physical transit-time to even the closest planets to Earth can take years. As a result, current spacecraft systems must carry energy-sources, create their own energy by use of solar panels, or they need to be replenished via logistics. The latter, e.g. logistics, can take years to accomplish. Solar panels, while effective for generating energy using externally radiated energy (e.g. Sun's radiated energy) can be problematic because as the spacecraft gets further from the Sun or a star, radiated-area power intensities diminish. One result is that such energy collection becomes more difficult, and typically requires more time to 'sun-bath', that is, the collection of energy from the Sun take longer periods of time.

In another example, the Mars Rover mission operations are limited by power. Specifically, solar intensities on Mars supported only limited operations. At the distance from the sun, the solar intensity would provide less than one Watt per square foot for a solar panel operating at 30% efficiency.

Solar power systems provide energy that is derived from solar radiation at a radiated intensity. However over vast distances, and as illustrated by the above examples, the solar radiation intensity may decrease.

Electromagnetic energy (including solar energy) provides the only means to deliver energy quickly to a remote device to power or recharge a power storage system. While solar power systems provide energy that is derived from solar radiation at a radiated intensity, over vast distances the solar radiation intensity may decrease. Further, energy at radio frequencies wavelengths and high-powered microwaves do not focus as tightly as does energy at optical frequencies. In beamed power systems, these frequencies may require large transmitting arrays to establish effective intensities. Transmitter-array size and a large lobe volumetric-size of effective radiated power limit propagation over vast distance at needed power-densities.

Therefore, there still exists an unmet need to effectively transmit large power intensities over vast distances to remote devices to enable enhanced performance and greater operations.

BRIEF DESCRIPTION

In one aspect, a method for transmitting power over long distances to a remote device is provided. The method includes positioning a lens between a photon source and a photon receiver, the lens, photon source and photon receiver being physically separate systems, focusing a plurality of photons originating from the photon source using the lens, collecting the photons at a receiver, and utilizing the collected photons to generate electrical power.

In another aspect, a method for transmitting power over long distances to a remote device is provided. The method includes positioning a lens between a photon source and a photon receiver, the lens and photon source physically separate systems, focusing a plurality of photons using the lens, collecting the photons at a receiver operatively connected to the lens, generating a laser beam utilizing the collected photons, and propagating the laser beam to a target.

In still another aspect, an energy transmission system comprising a lens having a surface area greater than one sq/km positioned in space and configured to focus a plurality of photons to a target is provided.

In yet another aspect, a method for providing power to a remote device is provided. The method includes collecting energy from at least one energy source, converting the collected energy to laser energy, directing the laser energy to a receiver, converting laser energy received by the receiver for use by the remote device, and using the converted energy to provide at least a portion of the energy needs of the remote device.

In another aspect, a system for generating power for remote devices is provided. The system includes at least one energy generation and emission source operable to collect energy from at least one energy source and convert the collected energy to laser energy, an energy directing system and propagation medium for directing the laser energy in a specific direction, an energy receiver for receiving the light energy from the energy directing system and propagation medium, an energy collection and storage device coupled to the energy receiver, and an energy transference device for converting collected energy for use by remote devices.

The features, functions, and advantages that have been discussed can be achieved independently in various embodiments or may be combined in yet other embodiments. Further details can be seen with reference to the following description and drawings.

DETAILED DESCRIPTION

The disclosed embodiments are directed to a light-spectrum energy augmented power system and method of transmitting power over great distances. As further explained herein, to the system and method provides for distributed architectures which integrate devices and processes for the propagation of light energy to a spacecraft, satellite, rocket or terrestrial system, and the subsequent use of the propagated energy in the generation of power. The processes include harnessing or developing one or more of the systems and processes disclosed, including but not limited to, one or more elements of power generation systems and processes, energy-directing systems and processes and propagation mediums, energy-receiving processes and systems, energy-focusing collection and storage systems and processes, and energy-transference storage and use systems and processes.

As described with respect to the disclosed embodiments, energy capture and use can support prime-power requirements or augmentation of other power sources to derive more efficient use of system capabilities. For example, a laser energy beam can provide great intensity and can travel great distances at light speed. The energy intensity, controlled emission rate, timing, and speed of delivery can support direct power-use and also energy-storage and faster recharge-rates.

Figure 1:
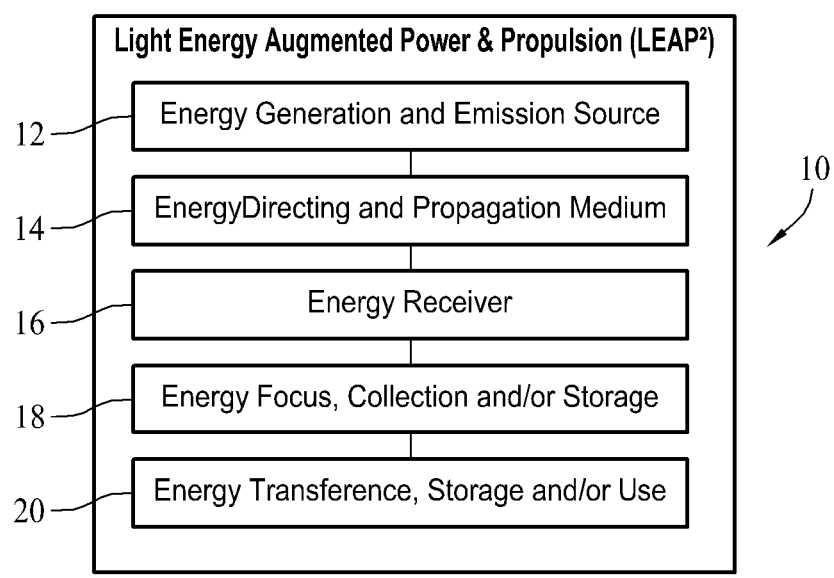
FIG. 1 is a block diagram of light energy augmented power architecture.

Now referring to FIG. 1, a light energy augmented power and distribution architecture 10 is illustrated. This distributed architecture 10 integrates devices and processes for propagation of light energy to a spacecraft, satellite, rocket or terrestrial system, and uses of the propagated energy for generation of power.

The processes performed within architecture 10 include useful, concentrated energy generation systems and processes 12. These energy generation systems and processes 12, which in embodiments can be a human-engineered system (e.g. a high-energy laser) or systems that couple naturally occurring radiation (e.g. Sun/star), or both. Architecture 10 further includes energy-directing systems, processes and propagation mediums 14, which include, for example, laser beam direction processes/systems and propagation mediums that are operable in an atmosphere or within the vacuum of outer-space. Energy-receiving processes/systems 16 are included in architecture 10 as are energy-focusing, collection, and storage processes/systems 18. Architecture 10 further includes energy-transference, storage and/or use processes/systems 20.

The processes and systems within architecture 10 are described in an engineered system, and may include naturally occurring phenomenon (nature) within the process. In this regard, engineered capabilities (embodiments) are considered that use the described embodiments, entirely or in part, to derive enhanced-power capabilities.

The embodiments support both local and remote-distant energy propagation and radiated energy concentration and use. The described systems augment power\capabilities within a system. For example, the components of architecture 10 are capable of coupling propagated light-energy within an atmosphere (Earth's, Mars', etc.) or between planets and/or to space systems that are in outer space. This capability includes systems that are remotely-inaccessible and distant, including remote military operations on Earth, separated spacecrafts/satellites, and space exploration to name a few.

The embodiments provide direct use of internally powered components and energy storage. Internal power use and energy storage includes electrical/electronic needs, attitude control reactions, and internal-workings, as well as, articulated-component power. Architecture 10 effectively reduces the weight/volume of power carried by systems, as well as, those associated with replenishment/resupply logistics (e.g. systems to refuel, recharge of batteries, etc.) Less weight and volume are needed for internal power sources, smaller systems are needed for energy storage/banking, and protection of energetic chemicals. The ability to get more energy enables measured use of power, versus burst-energy at higher-power (typically provided by power-dense chemicals) to confidently assure adequate mission objectives. Further the system may provide shorter resupply timelines, may be more accessible, provide a quicker recharge and a faster delivery without physical transport and reduce extensive delivery and distribution systems.

The system may enable devices that use solar power technology on Earth to operate on other planets (e.g. Mars) or celestial bodies (e.g. moons), without having to transport all the potential energy. The system propagates power-densities even when the solar-irradiance is significantly less dense due to vast distances and/or eclipse. In this regard, the system enables needed light irradiance (at, or greater than, Earth's solar-power densities). Effectively this enables Earth's solar technology supporting, but not limited to, solar vehicles that use surface-terrestrial and atmosphere mobility means, solar powered buildings/factories, and growth biological gardens and spheres. System may be applied to propagate energy to remote Earth locations including air vehicles (e.g. high-altitude UAV), surface systems (e.g. distant mountain peak), and sub-surface systems (e.g. submerged ocean sensor).

The described embodiments, without limitation, include laser-energy propagation enabled by collimated-light beam propagation that maintains useful farfield intensity. Delivery is at the speed of light. The embodiments integrate laser power generation, energy propagation, energy collection and energy conversion/transference and use. The embodiments are defined above as architecture 10 which significantly enables capabilities using a high-energy laser (HEL), laser propagation between objects, collection of the energy and capabilities that convert laser-energy to enable useful power capabilities.

Figure 2:
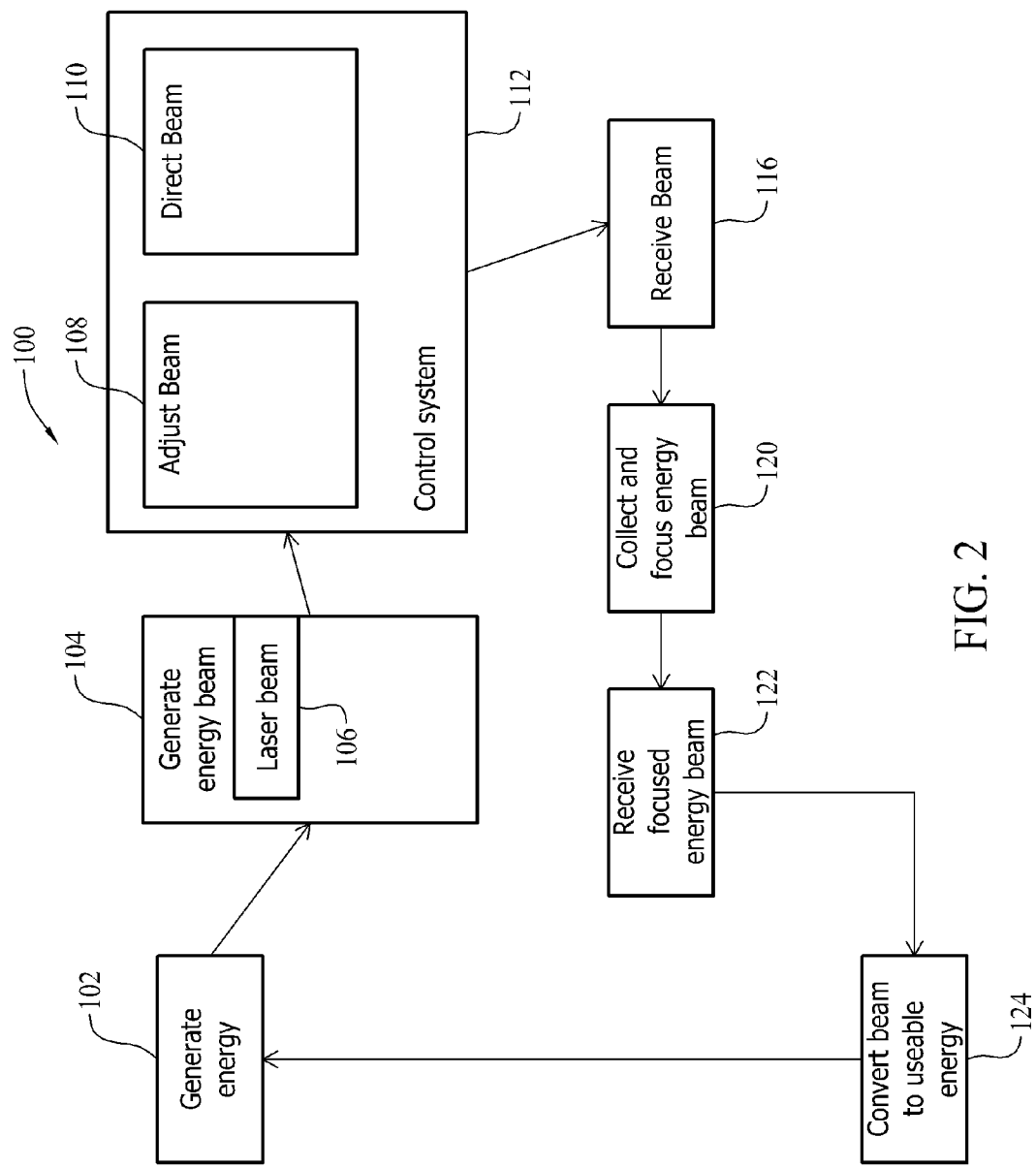
FIG. 2 is a flowchart illustrating a light energy augmented power process flow.

FIG. 2 is a flowchart 100 illustrating a process for effectively transmitting energy over vast distances. When energy 102 is available, it may be collected or in alternative embodiments, generated from sources such as solar radiation, nuclear power, chemical power, thermal sources or other energy sources. The collected energy 102 may be utilized to generate an energy beam 104 such as a laser 106 or amplified emission of photons in a directed beam. The energy beam 104 may be adjusted 108 and/or directed 110 by a control system 112.

The control system 112 provides instructions to the beam adjustment system 108 that adjust the laser 106 and directs 110 the laser beam to the future position of the receiver 116. In the case of a receiver on the Earth's moon and the distance from a laser system on Earth, travel time and lead angle considerations are about 1.3 seconds at light speed. In the case of a receiver in the vicinity of Mars, the time and lead-angle considerations can be about 10 minutes at light speed. The beam is propagated, through operation of the control system 112, to the receiver 116. In the Earth's atmosphere the beam is affected by air. In space the beam is less perturbed due to the vacuum within outer space. Nevertheless, the beam will diverge. The human-engineered transmission of light-energy may boost and/or augment power in a concentrated and collimated energy-beam. In one scenario, if the receiver 116 is near, the beam may be spoiled so that intensity does not overpower the receiver 116. After about 110,000 to about 1,000,000 kilometers, even a collimated laser beam diffuses so that when such a beam impinges the receiver, the farfield intensity is similar to a few-multiples of the Sun's radiated energy on Earth and does not over power the receiver.

The radiated energy is received by receiver 116. In one embodiment, power intensity is measured and the receiver provides feedback, for example, on/off, more/less, quality, adjustments, schedule, etc. to the control system 112.

The energy received at receiver 116 is focused and collected. Depending on intensity, time of collection, and conversion/use rates, the focusing and collection may require the ability to manage intensely strong power-densities; potentially those intensities that melt steel/metals, or to concentrate significantly weaker power-densities to gain utility from nature-radiated energy (e.g. Earth's level of solar radiation density). For example, due to distance, the intensity of the solar-energy on Mars is less that half the intensity of the Sun on Earth. As needed, the control system 112 works with the focus and collect system 120 to receive the photons and change their direction to effectively focus the photons to a desired focal point. From system 120, the energy is received 122 and processed for storage or direct-use 124.

Energy propagated in a laser beam, for example, tends to spread in relation to distance propagated. This divergence can be small (e.g., a thousandth of a radian), but over vast distances it represents significant spreading of the focused electromagnetic energy. The theoretical limit to contain an electromagnetic beam in a propagated column is the energy frequency ($\lambda$) divided by the diameter (d) of the transmitting exit. As the energy enters the propagating-medium, the beam-spread calculus is $\lambda/d$ multiplied by the propagation range/distance (R). For a laser (optical spectrum), the diameter is measured at the transmitting exit aperture. As propagation range/distance increases the beam spreads. Therefore, at the energy-receiving location the beam of energy has an increased cross-sectional area (Ar) in the farfield. Thus, $Ar=(\lambda/dt)R$.

Figure 3A:
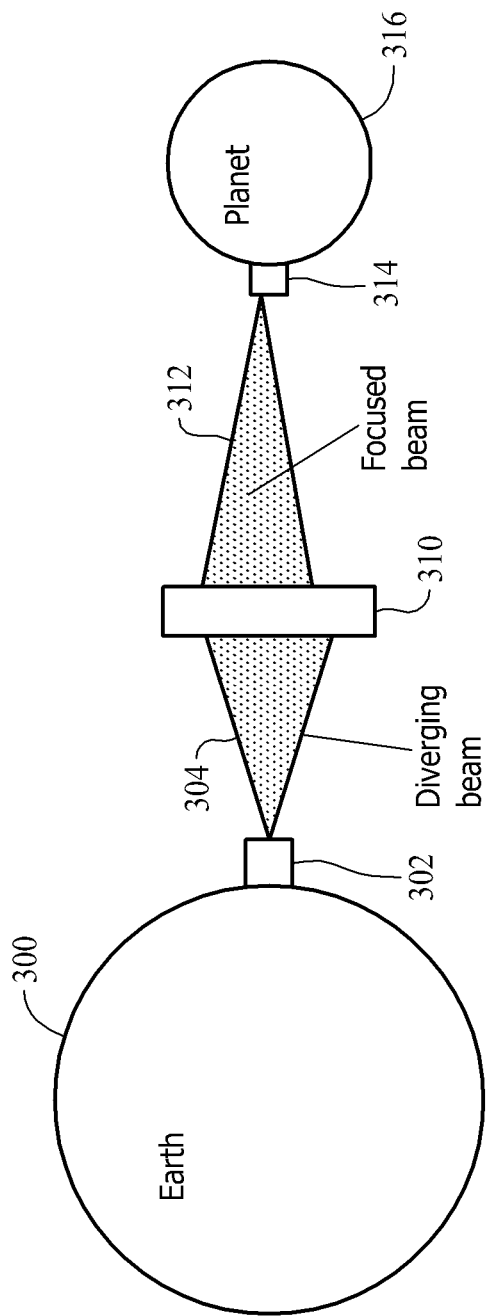
FIG. 3A is a depiction of a system that incorporates the architecture and process flow illustrated by FIGS. 1 and 2.

FIG. 3A is one embodiment of a deployment of the architecture and process illustrated by FIGS. 1 and 2. From Earth 300 a beam generation system 302 may generate a beam 304. As described herein, beam 304 may comprise a plurality of photons which may diverge over a long distance. At least a portion of the beam 304 is received by beam focusing system 310. The focusing system 310 may comprise a large flexible membrane for redirecting the beam to effectively focus the beam to a desired focal point. The beam focusing system 310 provides a focused beam 312 directed to a remote device 314 operable to utilize the focused beam 312 to generate energy, as described herein. In the illustrated embodiment, the remote device 314 is located on another celestial body 316, for example, a moon or another planet.

Figure 3B:
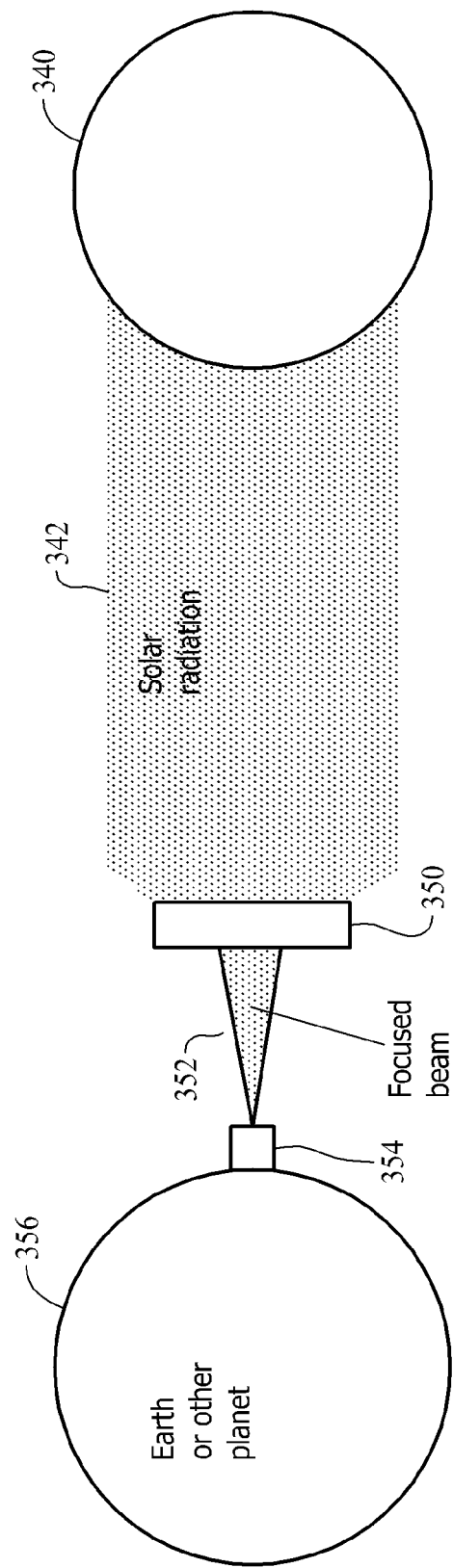
FIG. 3B is a depiction of another system that incorporates the architecture and process flow illustrated by FIGS. 1 and 2.

FIG. 3B is another embodiment of a deployment of the architecture and process illustrated by FIGS. 1 and 2. From the sun 340, solar radiation 342 propagates through the cosmos. A portion of that radiation 342 impinges beam focusing system 350 which is operable to use such energy to generate a focused beam 352, for example a laser beam, that is directed to a remote device 354 operable to utilize the focused beam 352 to generate energy, as described herein. In the illustrated embodiment, the remote device 354 is located on a celestial body 356, for example, the earth, a moon or another planet.

Figure 3C:
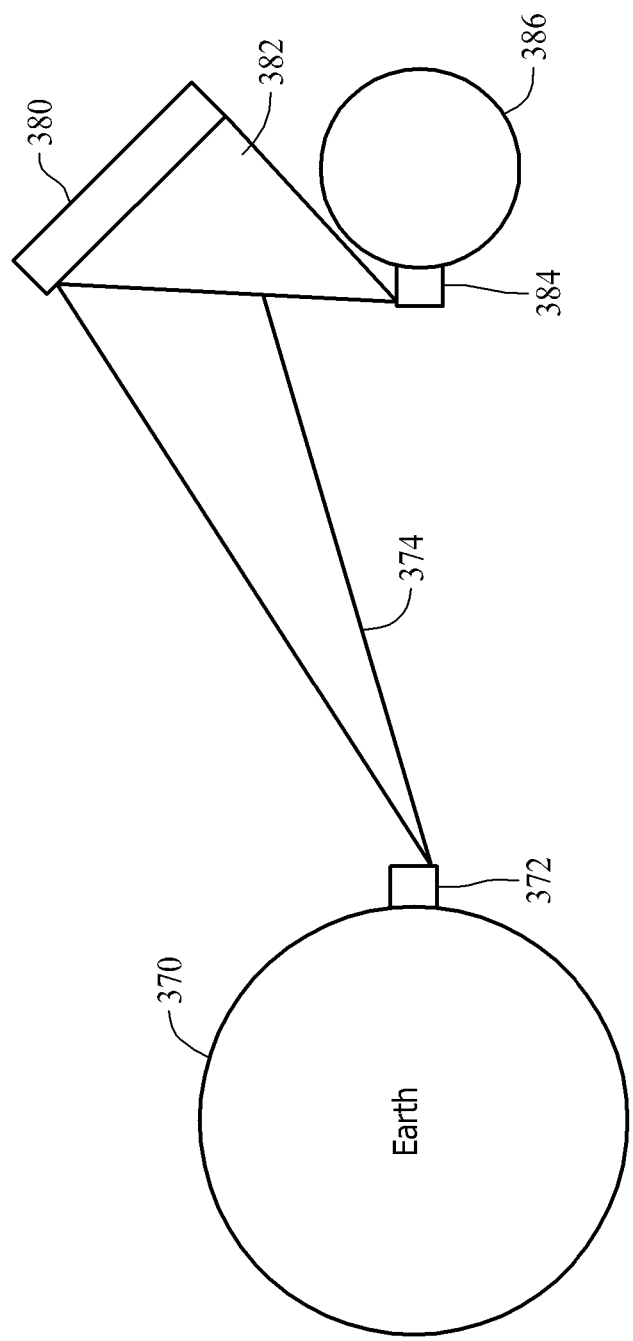
FIG. 3C is a depiction of still another system that incorporates the architecture and process flow illustrated by FIGS. 1 and 2.

FIG. 3C is still another embodiment of a deployment of the architecture and process illustrated by FIGS. 1 and 2. From the earth 370, a beam generation system 372 may generate a beam 374. As described herein, beam 374 may comprise a plurality of photons which may diverge over a long distance. At least a portion of the beam 374 is received by a beam reflecting and focusing system 380 disposed in space. The beam reflecting and focusing system 380 provides a focused beam 382 directed to a remote device 384 operable to utilize the focused beam 382 to generate energy, as described herein. In the illustrated embodiment, the remote device 384 is located on another celestial body 386, for example, a moon or another planet.

Figure 4A:
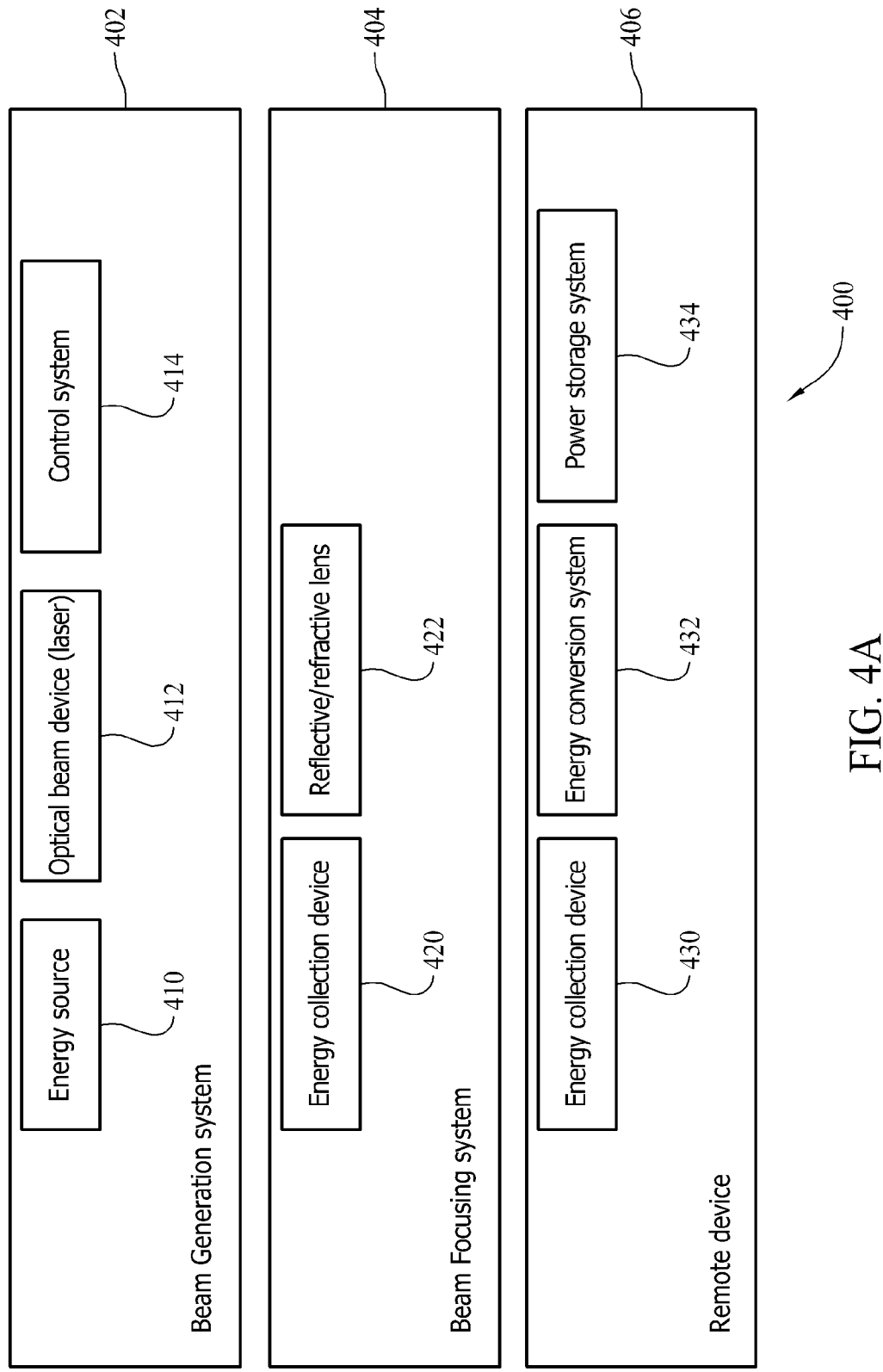
FIG. 4A is a block diagram that further illustrates a beam generation system, a beam focusing system, and a remote device 406.

FIG. 4A is a block diagram 400 that further illustrates the components associated with the process flow of FIG. 2 and the systems of FIGS. 3A and 3B including a beam generation system 402, a beam focusing system 404 and a remote device 406 which converts a received beam into energy for use and/or storage. Beam generation system 402 includes an energy source 410, an optical beam device 412, for example a laser, and a control system 414. The beam focusing system 404 includes an energy collection device 420 and one or more reflective/refractive lens 422. As described elsewhere herein, the remote device 406 includes an energy collection device 430, an energy conversion system 432, and a power storage system 434.

Figure 4B:
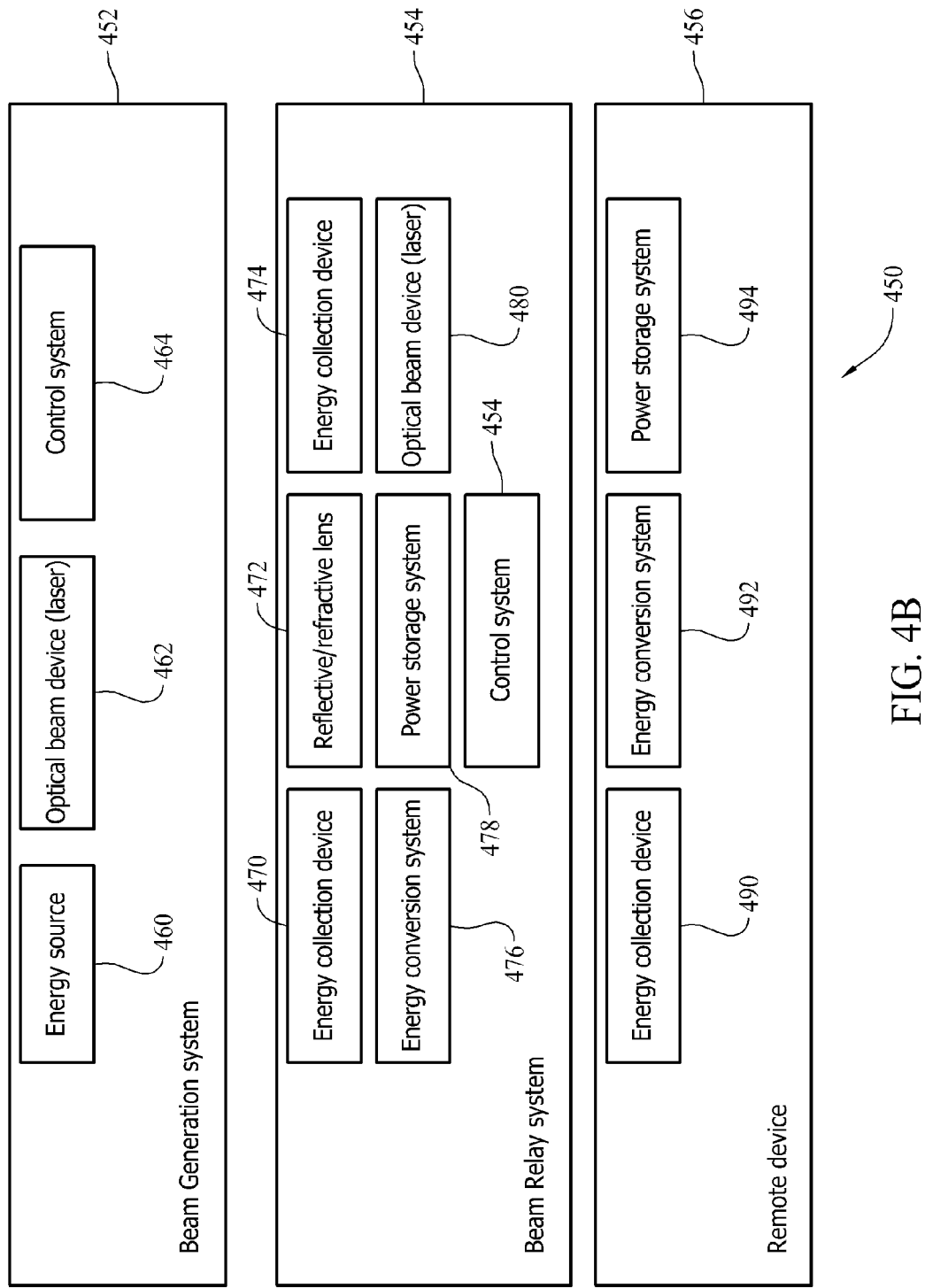
FIG. 4B is a block diagram that further illustrates a beam generation system, a beam relay system, and a remote device.

FIG. 4B is a block diagram 450 that illustrates another embodiment of a beam relay system and includes a beam generation system 452, a beam relay system 454 and a remote device 456 which converts a received beam into energy for use and/or storage. Beam generation system 452 includes an energy source 460, an optical beam device 462, for example a laser, and a control system 464. The beam relay system 454 includes an energy collection device 470, one or more reflective/refractive lens 472, an energy collection device 474, an energy conversion system 476, a power storage system 478, an optical beam device 480, and a control system 482. As described elsewhere herein, the remote device 456 includes an energy collection device 490, an energy conversion system 492, and a power storage system 494.

The processes and systems described herein can be repeated so as to provide an expanded, energy-relay architecture which entails transmitting of energy, propagation, receiving of energy, then the re-transmitting of the energy, further propagation of the energy, and receiving of the energy at the distances, plus the storage and usage of the energy. Such a configuration is shown and described with respect to FIG. 5.

Figure 5:
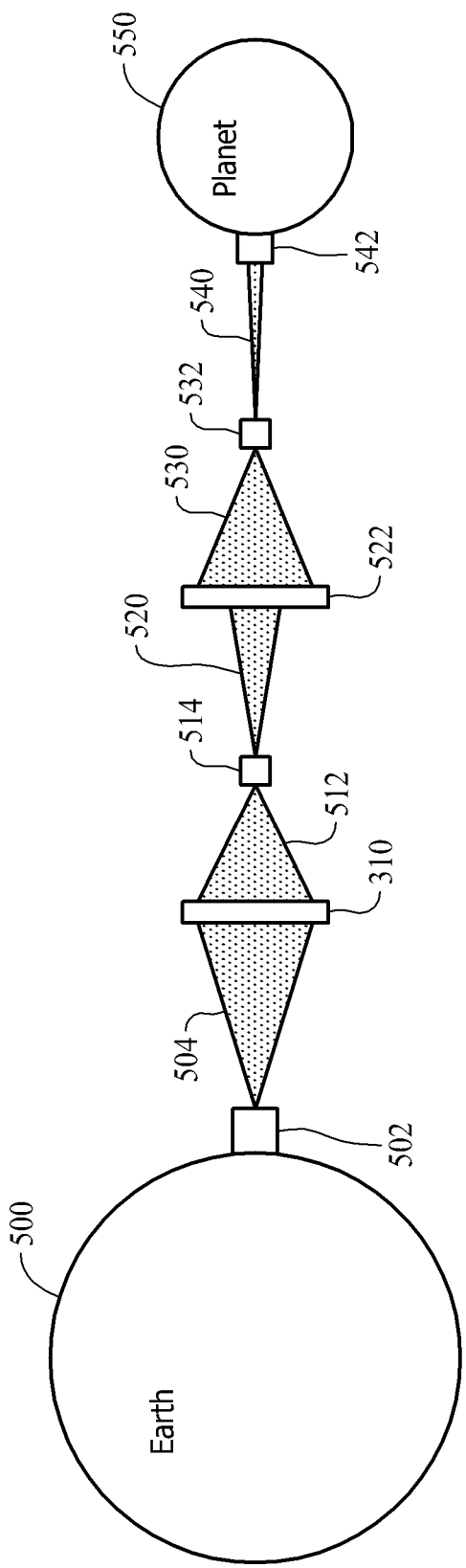
FIG. 5 is an example embodiment that incorporates multiple beam receiving and focusing components.

FIG. 5 is an example embodiment that incorporates multiple beam receiving and focusing components. From Earth 500 a beam generation system 502 generates a beam 504 that diverges over a distance. At least a portion of beam 504 is received by beam focusing system 510. The beam focusing system 510 uses the energy to generate and/or provide a focused beam 512 directed to a first remote device 514 which generates a beam 520 that diverges over a distance until it is received by second beam focusing system 522. The second beam focusing system 522 also uses the received energy to generate and/or provide a focused beam 530 directed to a second remote device 532 which generates a beam 540 in the same manner that is ultimately received by a third remote device 542 operable to utilize the focused beam 540 to generate energy, as described herein. In the illustrated embodiment, the third remote device 542 is located on another celestial body 550, for example, a moon or another planet. The embodiment of FIG. 5 is one example. Architectures can incorporate fewer or more of the focusing and generations systems described.

The embodiments described herein include a remote receiver that concentrates energy propagation through a large area. In one embodiment, the focusing system incorporates a thin-film (for example, a plastic refractive or reflective membrane that is potentially several kilometers wide) to capture and focus emissions generated as described herein traveling vast distances in space. A polyester film such as Mylar, may be one example of material that may form the membrane.

As those skilled in the art will appreciate, the distance from Earth to Mars varies depending on their relative positions in elliptical orbits. This Earth-Mars distance ranges between 54 million kilometers and 400 million kilometers. For this calculation, a relative-position might be 200 million kilometers between Earth and Mars, and thus a distance between certain elements of the augmented power system 10. In this calculation a laser at the Earth's moon or in Earth orbit might operate at frequency 106 nm. With an aperture of 1-meter the Earth's-moon laser can theoretically propagate a collimated and directed laser beam a vast distance and thus produce a cross-section spot diameter of 21 km at a receiver in Mars orbit. This large spot while dispersed and low power-density per unit area (i.e. benign) at Mars, can be extremely valuable.

While laser energy propagation characteristics at interplanetary distances are uncertain, the farfield spot, which is defined as the spot that contains half-of-the-propagated-energy might be received. This energy arrives in the vicinity of Mars approximately 10 minutes after transmission. The focusing system may be comprised of a lightweight deployable optical system; deployed by an adjustable lightweight telescoping framework as a thin film membrane that is stretched to cover a large area (perhaps several kilometers in diameter). The membrane focuses and directs the light where it can be collected and processed.

With appropriate direction and steering of the laser beam, a hypothetical large diameter for example, without limitation, a 10 km diameter receiver, in a farfield with Gaussian-distribution of energy can collect a significant fraction of the energy in the propagated beam. In this regard, a deployable, optical-prescription adjustable-shape, lightweight large membrane supports an energy receiver that can collect a significant fraction of the farfield spot. As an illustrated example, without limitation, the focusing system may take the form of a large collapsible umbrella with deployment struts. In the vacuum of outer space there are few conditions to significantly deform the large-sized optical prescription. The lightweight thin film can be a thin plastic-like membrane; it can be shaped to optical prescription, it can utilize transmissive properties within the thin film including refraction and diffraction to further collect and focus the radiating energy or photons. Note that the light-energy after diffraction by the receiver may be merely a color-wavelength, but lack laser properties such as columniation needed for continued-propagation to additional vast distances. The lack of laser properties is not a problem as one purpose of the receiver is to help collect and concentrate a significant fraction of the benignly-dispersed energy in the farfield. In one embodiment, such as the systems shown in FIG. 5, the focusing system focuses the beam photons and concentrates it where it can be utilized to generate energy in a mechanism that is attached to the focusing system. In a further embodiment, the focusing system may have a parabolic shape and utilize reflective-properties and coatings to bounce/reflect and focus the light into an energy conversion device.

Both transmissive and/or reflective approaches can be used separately or in special configurations together. Further the focusing system may support a coherent communications/signal feedback to effectively aide ultra-precise pointing, tracking and stabilization.

Figure 6:
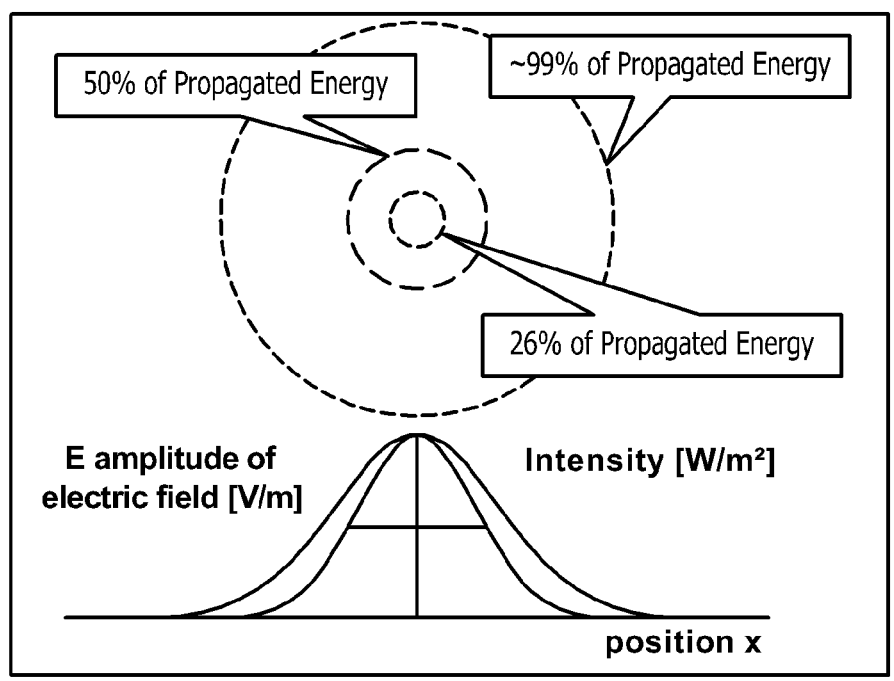
FIG. 6 is a diagram illustrating dispersion of energy intensity in a farfield spot according to a Gaussian-distribution.

The energy intensity in the farfield of the propagated laser beam is likely dispersed as a Gaussian-distribution as shown in FIG. 6. The rate of delivery is scaled by the distance and comparable to that transmitted minus the scattering losses. Depending on the power of the transmitted laser beam, a fraction of the light-energy (area) of the laser beam can be captured, and may exceed Earth's daytime radiation power-density (and significantly exceed the Mars' daytime radiation power-density by several orders of magnitude.) Further, potentially given transmission geometries, the augmented energy transmission system 100 can enable energy propagation which is not limited to planet orbits or day or night planetary rotation.

Light radiates from the Sun spherically, and travels vast distance to Earth, and separately to Mars. Grossly, the planet (Mars) is small and round; a very small fraction of the Mars light reflects off Mars' planetary surface. The low intensity reflection is not shaped to optimize the return for viewing in the night sky on Earth. Yet, these photons, which reflect off Mars, are seen nightly in the Earth sky. This emphasizes that light routinely travels these distances, as well as, the intended path for the higher power-density in the disclosed system.

The energy propagation system described herein addresses laser propagation of energy in a beam, a designed cooperative receiver to capture the spread energy and focus it into a device that concentrates the energy into a higher-intensity per unit area. This concentrator then processes the energy to use and/or for storage in an energy storage system.

As easily understood, the distances are potentially quite vast, and precise beam stabilization and pointing is needed at the transmitter. In this regard, the Earth orbits the Sun at high velocity (average velocity is potentially approximately 1 M kilometers per hour); Mars orbits the Sun at even faster velocities (average velocity is potentially approximately 3 M kilometers per hour). Potentially with one planet 'in-grade' and the other in 'retro-grade', the relative vector-speed (Earth in its orbit and Mars in its orbit) is potentially 4 Million km/hr. At a distance of 200 M km, photons transmitted at one instance arrive after approximately 10 minutes. Considering astrophysics and given a potential relative velocity approaching 4 M km/hr, the transmission-system must predict the orbiting Mars receiver-position at the photon-arrival. The transmitter-to-receiver position might change 37,000 km between the laser photon transmission and its arrival at the receiver.

The energy receiver can provide a large capture-area of the propagation (distributed farfield), collecting a meaningful portion of the 21 km laser energy spot, and concentrate it for processing that supports storage and/or use. The relative geometries are moving, and the angular-slew rate, while slow at these propagation distances, must be precise. Despite the energy propagation delay and the relatively-large farfield spot, a feedback loop is beneficial. In this regard, a time-stamp and coherent-signal embedded in the power-beam can help improve power-intensity and rate of collection. In one example, and without limitation, every minute the propagated-beam might be nutated with a known offset angle.

A simple alphabetic signal with time can help provide laser beam steering-feedback to adjust the directed beam towards the beam receiver 116. Referring again to FIG. 2 and for example, the energy receiver 116 can measure the farfield beam properties and communicate via a feedback loop to the control system 112 to adjust the directed laser beam. Interpolation can help provide appropriate offset adjustment for subsequent adjustments to propagation, and perhaps even more important, for orbit-repeat (learning).

As described herein, energy transmission can create a propagated intensity that substantially exceeds natural Sun radiation and supports power needs. However, at shorter distances (e.g. Earth-to-Earth orbiting satellite/spacecraft or a remote mountain peak) the pointing and tracking requirements may be significantly different (e.g. relaxed or tightened).

Further, in closer energy propagation applications, for example, to low earth orbit (LEO)/geosynchronous earth orbit (GEO)/Moon satellites, the focusing system enables diffused-energy collection where the high energy laser (HEL) propagation beam is intentionally diffused (spoiled) so as to reduce the spot intensity. This diffusion also allows simpler less expensive designs (engineering and materials) to prescriptively direct and manage the propagated energy.

Figure 7:
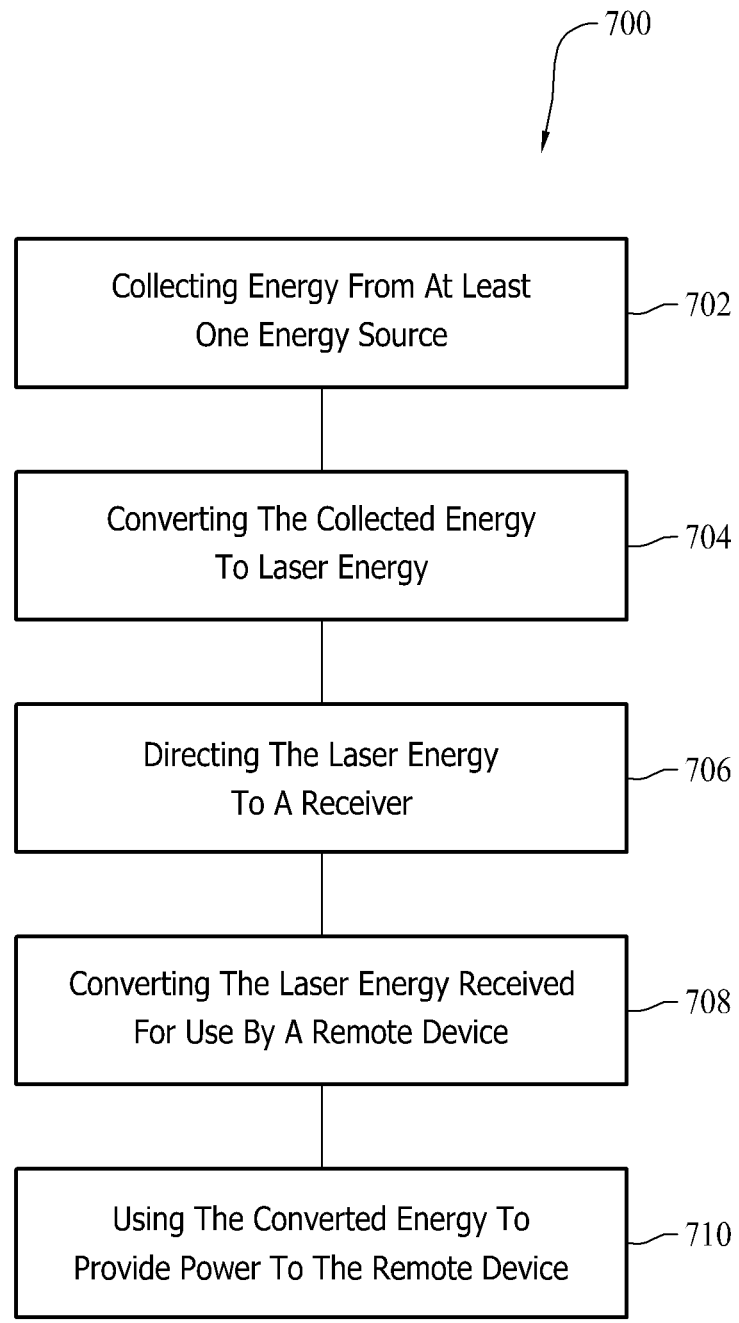
FIG. 7 is a flowchart illustrating a method for providing power to a remote device.

As described herein, an embodiment provides energy propagation through a distributed, efficient, high brightness lasers to augment power on remote devices. FIG. 7 is a flowchart 700 illustrating a method for providing power to a remote device. The method includes collecting 702 energy from at least one energy source, converting 704 the collected energy to laser energy, directing 706 the laser energy to a receiver, for example, one of a current position and a future position of a receiver, converting 708 laser energy received by the receiver for use by the remote device, and using 710 the converted energy to provide at least a portion of the energy needs of the remote device. As described herein, converting laser energy received by the receiver includes focusing the laser energy to a focal point to produce a concentrated beam spot. Directing the laser energy includes one or both of collimating the laser propagation to maintain far field intensity and controlling the propagated power and/or intentionally dispersing/spoiling the beam so that intensity does not overpower the receiver.

The amount of laser energy received by the receiver is controlled, in one embodiment and as described herein by providing feedback from the receiver to the source of laser energy. In embodiments, a portion or all of the directed laser energy is captured using a membrane optic receiver which concentrates the captured laser energy into a higher-intensity per unit area.

The embodiments provide a method that includes obtaining energy from an energy source, producing a laser beam using the energy obtained from the energy source, projecting the laser beam from a first platform, receiving the laser beam through an optical window/opening/device, steering and/or focusing the laser beam to work within a second platform, thermal heating material within the platform and potentially steering a portion, or all, of the light energy to a conversion system to generate electricity, heat or other energy form.

The embodiments further provide a method that includes obtaining energy from an energy source, producing a laser beam using the energy obtained from the energy source, projecting the laser beam from a first platform, focusing the laser beam using a refracting and/or reflective membrane to a focal point producing a concentrated beam spot at a second platform, and photonic energy conversion with the concentrated beam to generate electricity, heat or other energy form.

In one embodiment, technical effects of the methods, systems, and computer-readable media described herein include at least one of: (a) obtaining energy from an energy source, such as a solar cell array, (b) producing a beam using the energy from the energy source, (c) directing and propagating the beam to a distance through a transmissive medium including gas (e.g. air atmosphere), liquid (e.g. water), solid (e.g. glass) matter and/or the absence of matter (e.g. the vacuum of outer space), (d) focusing the laser beam using a transmissive and/or reflective optics, including a refractive or reflective membrane, (e) focusing the beam to a focal point producing a concentrated light-energy spot, and (f) converting the energy from the concentrated light-energy spot to generate electricity, heat or other energy to include both kinetic and potential energy forms.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advent ages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for transmitting energy over long distances to a remote device comprising:
    positioning a lens in conjunction with a photon source and a photon receiver, wherein the lens, photon source and photon receiver are physically separate systems, and wherein a refractive thin film lens is deployed in space;
    focusing a plurality of photons originating from the photon source using the lens;
    collecting the focused photons at the photon receiver; and
    utilizing the collected photons to generate electrical power.

2. The method of claim 1 wherein to deploy a refractive thin film lens, a Mylar film is deployed.

3. A method for transmitting energy over long distances to a remote device comprising:
    positioning a lens between a photon source and a photon receiver, the lens and photon source being physically separate systems;
    focusing a plurality of photons from the photon source using the lens;
    collecting the focused photons at the photon receiver, wherein the photon receiver is operatively connected to the lens;
    generating a laser beam utilizing the collected photons; and
    propagating the laser beam to a target.

4. The method of claim 3 wherein focusing a plurality of photons using the lens comprises:
    receiving the focused photons from a first lens; and
    refocusing the photons using a second lens positioned at a distance from the target and not physically connected to the target.

5. The method of claim 3 further comprising generating electrical power from the laser beam propagated to the target.

6. The method of claim 3 wherein positioning a lens comprises deploying the lens in space.

7. The method of claim 5 further comprising using the generated electrical power to provide at least a portion of the energy needs of the remote device.

8. An energy transmission system comprising a lens having a surface area greater than 1 square kilometer, wherein the lens is positioned in space and is configured to focus a plurality of photons to a target, and wherein the lens is a refractive thin film lens.

9. The system of claim 8 further comprising:
a target operatively connected to said lens and configured to receive the focused photons and convert them to electrical energy; and
a laser configured to propagate an optical beam using the electrical energy.

10. The system of claim 8 wherein said laser is positioned at a first location, said lens is positioned in space at a second location remote from the first location, said system further comprising a device configured to receive the optical beam from said laser, said device located at a third location remote from the first and second locations.

11. A system for generating power for remote devices, said system comprising:
a focusing system, positioned in space and decoupled from an energy source, the system having a lens shaped to focus a diffuse beam of optical radiation received from the energy source to a focal point;
an energy collection system coupled to the focusing system, the energy collection system configured to collect the focused radiation and convert it to electricity; and
a laser generation system coupled to the energy collection system and configured to produce a laser that effectively propagates energy from the energy source.

12. The system of claim 11 further comprising a remote device decoupled from the energy source and the focusing system, and configured to receive the laser from the laser generation system.

13. The system according to claim 11 wherein the energy source is configured for at least one of collimating a source laser for propagation to a distance, maintaining farfield intensity, controlling propagated power levels, and spreading the source laser so that the intensity of the source laser does not overpower said focusing system.

14. The system according to claim 11 wherein the energy collection system comprises a membrane optic receiver.

* * * * *